(12) United States Patent
Shiga et al.

(10) Patent No.: US 9,131,048 B2
(45) Date of Patent: Sep. 8, 2015

(54) COMMUNICATION SYSTEM AND COMMUNICATION CONTROL METHOD

(71) Applicants: Shingo Shiga, Tokyo (JP); Toshiyuki Tamura, Tokyo (JP)

(72) Inventors: Shingo Shiga, Tokyo (JP); Toshiyuki Tamura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/099,258

(22) Filed: Dec. 6, 2013

(65) Prior Publication Data

US 2014/0092782 A1 Apr. 3, 2014

Related U.S. Application Data (63) Continuation of application No. 13/122,274, filed as application No. PCT/JP2009/005195 on Oct. 6, 2009, now Pat. No. 8,634,318.

(30) Foreign Application Priority Data

Oct. 6, 2008 (JP) ................................ 2008-259419
Dec. 25, 2008 (JP) ................................ 2008-329148

(51) Int. Cl.
*H04M 3/436* (2006.01)
*H04L 12/413* (2006.01)
(Continued)

(52) U.S. Cl.
CPC ........... *H04M 3/4365* (2013.01); *H04L 12/413* (2013.01); *H04L 63/14* (2013.01);
(Continued)

(58) Field of Classification Search
USPC .......................... 370/252, 328, 401, 493, 496;
379/93.02, 114.14, 142.05, 210.02,
379/249; 455/410, 411; 726/22–28
See application file for complete search history.

(56) References Cited

U.S. PATENT DOCUMENTS 6,311,055 B1 10/2001 Boltz
(Continued)

FOREIGN PATENT DOCUMENTS

CN 1581904 A 2/2005
(Continued)

OTHER PUBLICATIONS

3GPP, "3rd Generation Partnership Project; Technical Specification Group Services and System Aspects; Service requirements for the Internet Protocol (IP) Multimedia core network Subsystem (IMS); Stage 1 (Release 10)", The 3rd Generation Partnership Project, 3GPP TS 22.228, V10.5.0, Dec. 2012, pp. 7-8, pp. 17-18.
(Continued)

*Primary Examiner* — Benjamin H Elliott, IV
(74) *Attorney, Agent, or Firm* — Sughrue Mion, PLLC (57) ABSTRACT

A communication system providing a multimedia service that informs a calling terminal that a communication sent from the calling terminal to a called terminal is undesired by the called terminal. Typically, the calling terminal is connected to a calling-side communication network, and the called terminal is connected to a called-side communication network; the called-side communication network includes an access request receiving device that receives an access request sent from the calling terminal; an access request cancel determination device that determines whether or not the received access request is cancelled; and an access request cancel notice sending device that sends an access request cancel notice when the access request is cancelled; and the calling-side communication network includes an addressee information communicating device that communicates addressee information to the calling terminal based on the access request cancel notice, where the addressee information is information of an addressee to be accessed so as to withdraw the cancellation of the access request.

4 Claims, 4 Drawing Sheets

(51) Int. Cl.
*H04L 29/06* (2006.01)
*H04W 4/16* (2009.01)
*H04M 7/00* (2006.01)

(52) U.S. Cl.
CPC ......... *H04L 65/105* (2013.01); *H04L 65/1006* (2013.01); *H04L 65/1016* (2013.01); *H04L 65/1079* (2013.01); *H04M 3/436* (2013.01); *H04M 7/006* (2013.01); *H04W 4/16* (2013.01); *H04M 7/0078* (2013.01)

(56) References Cited

U.S. PATENT DOCUMENTS

| | | |
|---|---|---|
| 6,330,317 B1 | 12/2001 | Garfinkel |
| 7,042,997 B2 | 5/2006 | Jones |
| 7,231,030 B2 | 6/2007 | Jones |
| 8,243,716 B2 | 8/2012 | Liu et al. |
| 8,365,284 B2 | 1/2013 | Wahl |
| 8,634,318 B2 * | 1/2014 | Shiga et al. ............ 370/252 |
| 2004/0221037 A1 | 11/2004 | Costa-Requena et al. |
| 2006/0093111 A1 * | 5/2006 | Peck .................. 379/114.13 |
| 2006/0182029 A1 | 8/2006 | Kealy et al. |
| 2007/0027993 A1 | 2/2007 | Schwagmann et al. |
| 2007/0041372 A1 | 2/2007 | Rao et al. |
| 2007/0121596 A1 | 5/2007 | Kurapati et al. ........... 370/356 |
| 2007/0150773 A1 | 6/2007 | Srivastava |
| 2007/0165821 A1 | 7/2007 | Altberg et al. |
| 2007/0283022 A1 | 12/2007 | Rajko et al. |
| 2008/0062968 A1 | 3/2008 | Takahashi et al. ........... 370/352 |
| 2008/0075258 A1 * | 3/2008 | Liu et al. ............ 379/210.02 |
| 2008/0089317 A1 | 4/2008 | Murakami et al. |
| 2008/0220740 A1 | 9/2008 | Shatzkamer et al. |
| 2009/0089375 A1 * | 4/2009 | Osterberg, Jr. ............ 709/206 |
| 2009/0103458 A1 * | 4/2009 | Charzinski et al. .......... 370/259 |
| 2010/0226261 A1 | 9/2010 | Piche .................. 370/252 |
| 2011/0179181 A1 | 7/2011 | Elz .................. 709/227 |
| 2011/0188412 A1 | 8/2011 | Shiga et al. |
| 2011/0211497 A1 | 9/2011 | Shiga et al. |
| 2011/0222481 A1 | 9/2011 | Shiga et al. ............ 370/328 |
| 2012/0297457 A1 | 11/2012 | Schulte et al. |
| 2014/0092782 A1 * | 4/2014 | Shiga et al. ............ 370/259 |

FOREIGN PATENT DOCUMENTS

| | | | |
|---|---|---|---|
| CN | 1630362 A | | 6/2005 |
| CN | 1984184 A | | 6/2007 |
| CN | 101035098 A | | 9/2007 |
| CN | 101132590 A | | 2/2008 |
| EP | 1 770 941 A1 | | 4/2007 |
| JP | 64-54854 A | | 3/1989 |
| JP | 1-95649 A | | 4/1989 |
| JP | 3-244257 A | | 10/1991 |
| JP | 4-32340 A | | 2/1992 |
| JP | 7-66868 A | | 3/1995 |
| JP | 2000-312256 A | | 11/2000 |
| JP | 2001177663 A | | 6/2001 |
| JP | 2003078609 A | | 3/2003 |
| JP | 2003-198756 A | | 7/2003 |
| JP | 2004-96531 A | | 3/2004 |
| JP | 2005-20524 A | | 1/2005 |
| JP | 2005244420 A | | 9/2005 |
| JP | 2005-277694 A | | 10/2005 |
| JP | 2007-60419 A | | 3/2007 |
| JP | 2007527633 A | | 9/2007 |
| JP | 2008-5102 A | | 1/2008 |
| JP | 2008-48055 A | | 2/2008 |
| JP | 2008099213 A | | 4/2008 |
| JP | 2008-205937 A | | 9/2008 |
| JP | 2008236033 A | | 10/2008 |
| WO | 2006108989 A2 | | 10/2006 |
| WO | 2007/085507 A1 | | 8/2007 |
| WO | WO 2007134810 A1 | | 11/2007 |
| WO | 2008/032466 A1 | | 3/2008 |
| WO | 2009/045212 A1 | | 4/2009 |

OTHER PUBLICATIONS

International Search Report for PCT/JP2009/005195 mailed Nov. 2, 2009.
"Telecommunications and Internet Converged Services and Protocols for Advanced Networking (TISPAN); Feasibility study of prevention of unsolicited communication in the NGN", ETSI TR 187 009, V2.1.1, Jul. 2008, pp. 16-18.
International search report for PCT/JP2009/005166 mailed on Nov. 2, 2009.
International search report for PCT/JP2009/005167 mailed on Dec. 1, 2009.
US Office Action for U.S. Appl. No. 13/122,267 dated on Mar. 25, 2013.
US Office Action for U.S. Appl. No. 13/122,264 dated on Apr. 8, 2013.
Chinese Office Action for CN Application No. 200980139195.5 issued on Apr. 28, 2013, with English Translation.
Chinese Office Action for CN Application No. 200980139194.0 issued on May 6, 2013 with English Translation.
Japanese Office Action for JP Application No. 2008-329148 mailed on May 28, 2013 with English Translation.
Japanese Office Action for JP Application No. 2008-329150 mailed on Jun. 4, 2013 with English Translation.
US Final Rejection for U.S. Appl. No. 13/122,267 mailed on Aug. 27, 2013.
Japanese Notice of Allowance for JP Application No. 2008-329150 mailed on Sep. 3, 2013 with Partial English Translation.
The Extended European Search Report for EP Application No. 09818954.1 dated on Sep. 6, 2013.
The Extended European Search Report for EP Application No. 09818970.7 dated on Sep. 6, 2013.
"Telecommunications and Internet Converged Services and Protocols for Advanced Networking (TISP AN); Feasibility study of prevention of unsolicited communication in the NGN", ETSI, <ETSI TR 187 009 V2.1.1>, Jul. 31, 2008, pp. 1-26 Cited in the CN OA.
Chinese Office Action for CN Application No. 200980139195.5 issued on Sep. 11, 2013 with English Translation.
Japanese Office Action for JP Application No. 2014-001023 mailed on Nov. 18, 2014 with English Translation.
Mariko Kondo, A Study on Internet Security Management of Network, vol. 95 No. 267 IEICE Technical Report, Japan, The Institute of Electronics, Information and Communication Engineers, Sep. 29, 1995, vol. 95, pp. 115 to120.
Japanese Office Action for JP Application No. 2014-001023 mailed on Mar. 3, 2015 with English Translation.

* cited by examiner

COMMUNICATION SYSTEM AND COMMUNICATION CONTROL METHOD

CROSS-REFERENCE TO RELATED APPLICATIONS

The present application is a Continuation application for Ser. No. 13/122,274 filed on May 23, 2011, which is a National Stage Entry of International Application No. PCT/JP2009/005195, filed on Oct. 6, 2009, which claims priority based on Japanese Patent Applications No. 2008-259419, filed Oct. 6, 2008, and No. 2008-329148, filed Dec. 25, 2008, the disclosures of all of which are incorporated in their entirety by reference herein.

TECHNICAL FIELD

The present invention relates to a communication system and a communication control method as a basis for a multimedia service which includes a voice service on an IP network.

BACKGROUND ART

In accordance with a recent trend using an IP (Internet protocol), an IP-employed system has, of course, been attempted for voice communication systems which representatively use a telephone network. A standardization group called "3GPP" (3rd generation partnership project) for mobile communication performs standardization of IMS (Internet multimedia subsystem) as a basis for a multimedia service which includes a voice service on an IP network. In recent years, a static or fixed IP system known as "NGN" (next generation network) has also been examined.

Current email services have a social problem in which a sender unilaterally sends an email (message) called a spam mail to a receiver, although the receiver does not want to receive the mail. Such a problem may be caused due to a considerable decrease in the communication cost accompanied with generalization of the Internet, or possibility of sending a large quantity of email from a network accessing terminal such as a personal computer which is easily available.

The above IMS, which will be popular in the future, will probably have a similar problem. A technique for protecting users from such a problem which is called SPIT (spam over IP telephony) is called "PUCI" (protection against unsolicited communication for IMS), and examination thereof has been started by 3GPP or the like. The following Patent Document 1 discloses an IMS network system.

PRIOR ART DOCUMENT

Patent Document

Patent Document 1: Published Japanese Translation, No. 2007-527633, of PCT International Publication, No. WO2004/071104

DISCLOSURE OF INVENTION

Problem to be Solved by the Invention

In light of the above circumstances, an object of the present invention is to provide a communication system and a communication control method which can protect user convenience against a problem relating to the above SPIT.

Means for Solving the Problem

In order to achieve the above object, the present invention provides a communication system providing a multimedia service that informs a calling terminal that a communication sent from the calling terminal to a called terminal is undesired by the called terminal.

In the above communication system, it is possible that the calling terminal is connected to a calling-side communication network, and the called terminal is connected to a called-side communication network;

the called-side communication network includes an access request receiving device that receives an access request sent from the calling terminal; an access request cancel determination device that determines whether or not the received access request is cancelled; and an access request cancel notice sending device that sends an access request cancel notice when the access request is cancelled; and the calling-side communication network includes an addressee information communicating device that communicates addressee information to the calling terminal based on the access request cancel notice, where the addressee information is information of an addressee to be accessed so as to withdraw the cancellation of the access request.

The present invention also provides a communication control method used in a communication system which controls communication between a calling terminal connected to a calling-side communication network and a called terminal connected to a called-side communication network, wherein:

an access request receiving device in the called-side communication network receives an access request sent from the calling terminal;

an access request cancel determination device in the called-side communication network determines whether or not the received access request is cancelled;

an access request cancel notice sending device in the called-side communication network sends an access request cancel notice when the access request is cancelled; and an addressee information communicating device in the calling-side communication network communicates addressee information to the calling terminal based on the access request cancel notice, where the addressee information is information of an addressee to be accessed so as to withdraw the cancellation of the access request.

Effect of the Invention

In accordance with the present invention, since a message which clearly indicates a disconnection by means of the operation of PUCI, and an addressee (telephone number or URL for the release request) to be accessed so as to release the registration as a bad caller are both communicated to the caller, it is possible to assist acquisition of information for recognizing a fact that the caller itself has been registered as a bad caller and for releasing such registration.

Also in accordance with the present invention, an interface between a calling-side HSS and a called-side IMS entity is newly defined so that the calling-side HSS can send the called side a request for releasing each subscriber who has been registered as a bad caller.

Accordingly, a subscriber who has corrected a target deficiency can inform the operator who has contracted the subscriber of the correction, and (a person in charge of) the operator can send a release request from the HSS through a maintenance and management system to each system in which the subscriber has been registered as a bad caller, thereby automatically issuing a release request for the subscriber who has been registered as a bad caller.

Also in accordance with the present invention, the present operator (communication carrier) can know information of a subscriber who belongs to the present operator and has been registered as a bad caller by another operator. Therefore, a further restriction may be imposed on a subscriber who has troubled another operator. Accordingly, it is possible to prevent a case in which not only is a spam call issued, but also the relevant network is affected by means of virus infection or the like.

MODE FOR CARRYING OUT THE INVENTION

Figure 1:
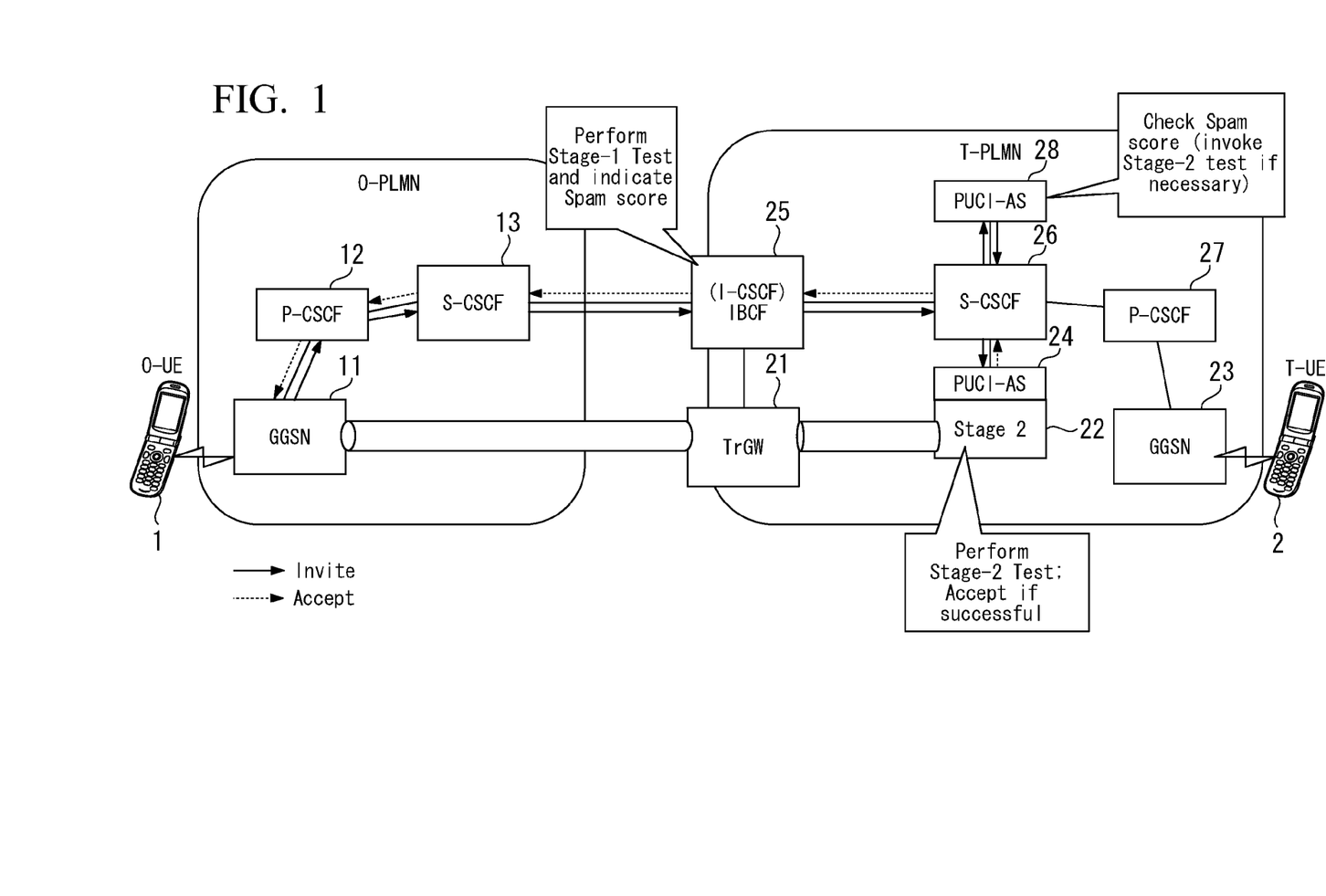
FIG. 1 is a block diagram showing the structure of an IMS network system.

FIG. 1 is a block diagram showing the structure of an IMS network system as an embodiment of the present invention.

The above FIG. 1 is a schematic diagram for an IMS network which employed PUCI. Before explaining the shown structure which solves target problems examined in PUCI, the operation concept of PUCI will be briefly explained below.

The leftmost O-UE indicates a calling terminal (i.e., originating UE), and the rightmost T-UE indicates a called terminal (i.e., terminating UE).

When the O-UE issues a call, a SIP INVITE message is issued for a SIP-URI (session initiation protocol-universal resource identifier) of the T-UE. This message is relayed in routing by an IMS of a calling-side mobile communication network called O-PLMN (public land mobile network), and received by a called-side mobile communication network called T-PLMN.

In IMS network systems, communication is performed using a SIP protocol. The above SIP-URI is an identifier on the SIP protocol, which is allocated to the O-UE or T-UE so as to identify the relevant O-UE or T-UE.

The O-UE tries to issue a call by sending the INVITE message to the SIP-URI of the T-UE. The INVITE message is first sent from the O-UE via a GGSN (gateway GPRS (general packet radio service) support node) 11 to a P-CSCF (proxy call session control function) part 12 (as a SIP server), and then relayed by the IMS of the O-PLMN on the calling side, so that it arrives at the T-PLMN on the called side.

An IBCF (I-CSCF) part 25, that is, an interconnect border control function (interrogating call session control function) part positioned at the entrance of the called side checks the reliability of a terminal which issued a call by any method (e.g., checks the probability that this call is the above-described SPIT), and writes information of a determined result or the like onto a header portion of the SIP INVITE message.

Such a passive operation of determining a calling party will be called a "Stage 1 test" below.

After that, the INVITE message is sequentially transferred between nodes inside the called-side IMS, and transmitted to an S-CSCF (service call session control function) part 26 which controls the T-UE.

The S-CSCF part 26 refers to the information stored in the INVITE message. If the S-CSCF part 26 determines that the relevant call is the SPIT and thus is worthless for reception, the S-CSCF part 26 can reject receiving the call without transferring the call to the relevant terminal. On the contrary, if the call is determined to be a good call to be received, the INVITE message is transferred to the relevant terminal, so that the call reception is completed.

In addition, a PUCI-AS (application server) 24 can be connected to the S-CSCF part 26, by which an optional determination logic can be added. That is, a test involving the calling side may be performed by, for example, observing a reaction to an intentional failure for call reception, or implementing an additional button operation. Such a test will be called a "Stage 2 test" below.

As described above, in the PUCI, no specific call control on the calling side (O-PLMN) is defined, and the called side (T-PLMN) performs various controls for defending against the SPIT by means of a CSCF part and a PUCI-AS which are entities for processing each call.

For the above-described IMS network system, the present embodiment has:

<1> Function of feeding information back to the caller for a call whose reception has been restricted through PUCI.

In the PUCI specification, the called side avoids a spam call by spontaneously registering the relevant caller as a bad caller, and rejecting future calls from the caller. In such a case, a caller who has repeatedly issued a call to the same addressee innocently so as to reserve a ticket or the like may be insidiously registered as a bad caller through the PUCI function.

In the current PUCI operation, when reception of a call is rejected by PUCI, the caller is communicated of the session interruption through a message (e.g., SIP error response message) which indicates rejection of the call reception. Therefore, such a case cannot be distinguished from a general failure of the call reception, which may be inconvenient for a good user on the calling side.

In also consideration of such a case, convenience can be further improved by providing a function of informing a caller that the caller has been registered as a bad caller, and a method of releasing such registration as a bad caller.

Therefore, it is possible for a user to know that the user has been registered as a bad caller and to obtain information for releasing such registration by incorporating (i) a message which indicates that PUCI performed the interruption, and (ii) an addressee (telephone number or URL) to be accessed so as to release the registration as a bad caller into a message (e.g., SIP error response message) which indicates rejection of the call reception.

For the above-described IMS network system, the present embodiment also has:

<2> Function of collecting (by the calling side) information items for bad callers acknowledged by the called side, and making a calling-side operator collectively issue requests for releasing the relevant registrations.

When a terminal is invaded by a virus or has a trouble, it may issue lots of IMS calls with no intention of the owner of the terminal, and be registered as a bad caller by a plurality of operators.

Even though the owner has killed the virus or performed updating to a software version having no problem, the owner needs to individually ask each of the plurality of the operators so as to release the bad-caller information, which is inconvenient for users.

When a called-side operator is asked to release the bad-caller registration based on information obtained by the above function <1>, the called-side operator has to absorb a cost for handling a problem of the calling-side operator who may be bad, and there is room for improvement in the distribution of cost. Additionally, even when the owner of the relevant terminal asks the operator who has contacted the owner about the problem, only the called-side operator can release the target registration, which is inconvenient for customer support in the relevant operation.

When the above function <1> is implemented, each calling-side IMS entity (e.g., CSCF part) is able to determine that a subscriber has been registered by the called side as a bad caller, obtain information indicating which subscriber is rejected, and which network rejects the subscriber, and store the obtained information in a subscriber database (e.g., HSS (home subscriber server)).

Therefore, an interface between a calling-side HSS and a called-side IMS entity is newly defined so that the calling-side HSS can send the called side a request for releasing each subscriber who has been registered as a bad caller.

Accordingly, the above-described problem can be solved when a subscriber who has corrected a target deficiency informs the operator who has contracted the subscriber of the correction, and (a person in charge of) the operator sends a release request from the HSS through a maintenance and management system to each system in which the subscriber has been registered as a bad caller.

For the above-described IMS network system, the present embodiment also has:

<3> Function of imposing a further usage restriction on a bad caller.

By using the above function <2>, the present operator can know information of a subscriber who belongs to the present operator and has been registered as a bad caller by another operator. Therefore, a further restriction may be imposed on a subscriber who has troubled another operator. Accordingly, it is possible to prevent a case in which not only is a spam call issued by means of virus infection or the like, but also the relevant network is affected.

That is, a chain of ill effects can be terminated by performing, for example:

(i) rejection of mobility management (forcible disconnection or detachment);
(ii) rejection of connection to a specific network;
(iii) rejection of an access to a non-IMS service (e.g., Web service) from a user to whom PUCI has applied a restriction, where the rejection is performed in cooperation with a server of the non-IMS service;
(iv) rejection of issuing an IMS call, or transfer the call to another addressee (e.g., of a window for solving problems); or
(v) rejection of "IMS Registration"

The above functions <1> to <3> will be further explained in detail.

The above function <1> of feeding information back to the caller for a call whose reception has been restricted through PUCI For the above function <1>, the I-CSCF, P-CSCF, and S-CSCF entities on the called side perform distinctive operations.

When rejecting a call which failed a PUCI test, the above CSCF parts on the called side send a calling-side IMS entity a message (e.g., SIP error response message) which indicates rejection of the call reception. In this process, information which indicates the rejection by PUCI and a telegraphic message which indicates an addressee to be accessed so as to release the relevant registration are added to the corresponding SIP header. The telegraphic message may be a character string understandable by humans, or a telegraphic message to be understood by the calling terminal.

Calling Terminal

When a message (e.g., SIP error response message) which indicates rejection of reception of a call issued from a calling terminal is returned to the calling terminal, the calling terminal tries to read information which is included in the corresponding header and relates to PUCI.

When information relating to PUCI (i.e., PUCI-related information) is included in the relevant response message, if the message is understandable by humans, the message may be displayed on a screen. If the message is a telegraphic message having a format understandable by the terminal, a button operation or the like may be performed on the terminal so as to access an addressee (of a Web site or a customer center) so as to directly release the relevant registration.

Calling-side IMS entity (P-CSCF and S-CSCF)

The calling-side IMS entities do not modify the PUCI-related information in the SIP message sent from the called side.

The above function <2> of collecting (by the calling side) information items for bad callers acknowledged by the called side, and making a calling-side operator collectively issue requests for releasing the relevant registrations For the above function <2>, the P-CSCF and S-CSCF entities on the calling side perform distinctive operations.

When the entities obtain a result of issuance of a call from a subscriber and the result indicates restriction of the call reception by means of PUCI, the relevant information is extracted and sent to the HSS.

HSS on Calling Side

It stores information obtained by CSCF, and sends a release request signal to an addressee (which has been stored) for the release request when detecting a data input operation (as a trigger) of a person in charge of maintenance.

CSCF Part, PUCI-AS, and Other PUCI-Related Devices on Called Side

They check the release request signal received from the calling-side HSS. If the signal is proper, the registration (in the present network) for the relevant subscriber as a bad subscriber is released.

The Above Function <3> of Imposing a Further Usage Restriction on a Bad Caller

For the above function <3>, the HSS entity on the calling side performs a distinctive operations.

It determines whether or not a further restriction is necessary, based on stored spam action information of the relevant subscriber. If a further restriction is necessary, implementation thereof is tried by sending a restriction request signal to a peripheral node by means of the following devices.

(1) Exchange (e.g., SGSN, GGSN, or EPC System)

It forcibly disconnects a specific subscriber when receiving a location registration cancel request signal (e.g., cancel location signal) from a node (e.g., HSS or HLR (home location register)) which manages subscribers.

In another example, it rejects a PDN (packet data network) access request signal (i.e., a request signal for accessing an external network) from a specific subscriber when receiving a restriction request signal from HSS, so that a bad subscriber cannot access the relevant network.

(2) IMS Entity (CSCF)

When receiving a restriction request signal from HSS, it may reject call connection, transfer the relevant call to a problem handling window of the relevant operator, or reject registration to IMS (i.e., reject "REGISTER") so as to reject providing a service such as a voice call.

(3) Another Web Server Device or the Like

When receiving a restriction request signal from HSS, it may reject information service from the relevant Web server, or forcibly display a problem handling Web page of the corresponding operator.

Below the above function <1> (of feeding information back to the caller for a call whose reception has been restricted through PUCI) will be explained in detail.

Figure 2:
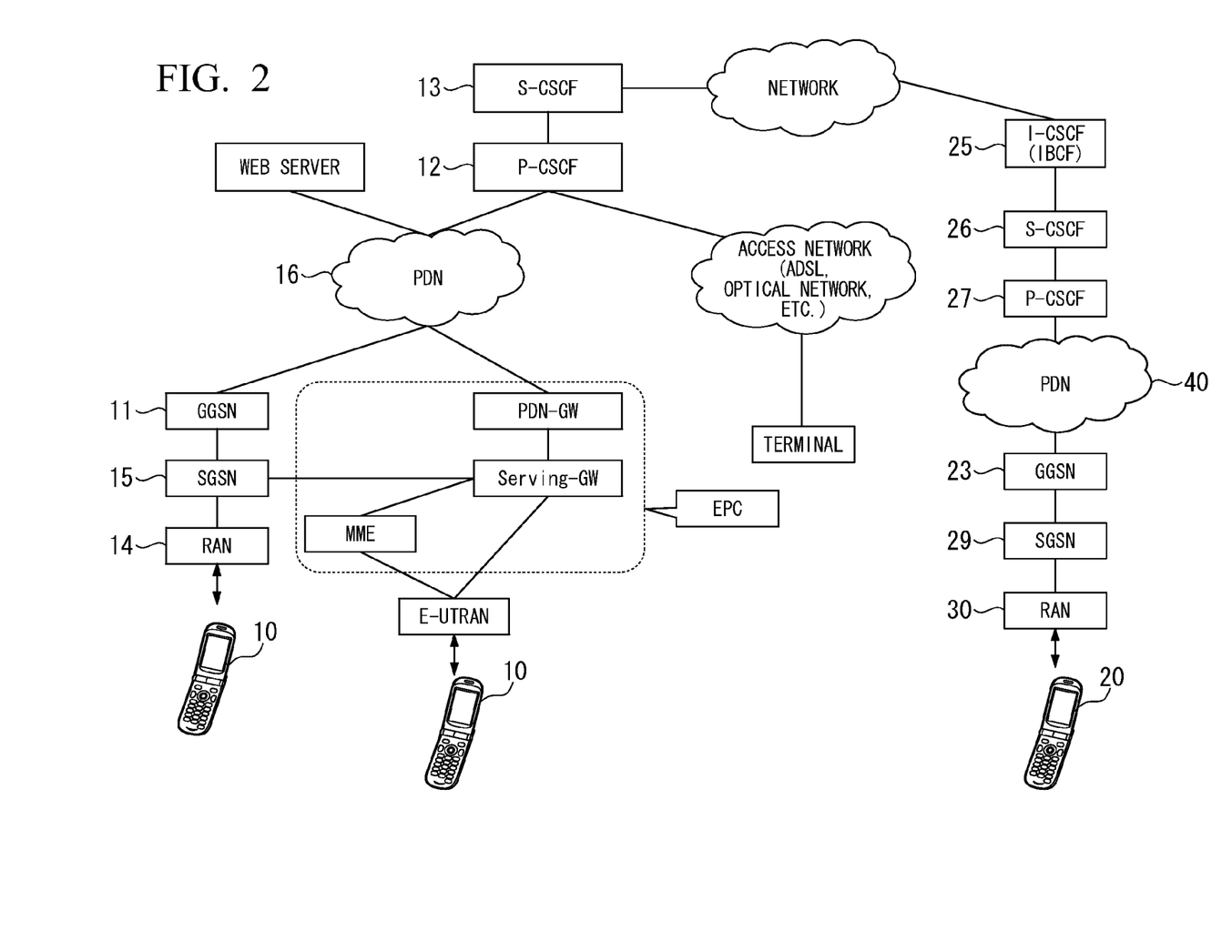
FIG. 2 is a second block diagram showing the structure of an IMS network system.

FIG. 2 is a second block diagram showing the structure of the IMS network system.

This diagram shows the structure of the IMS network system, which is shown in FIG. 1 and has the above function <1>, in more detail.

As shown in FIG. 2, in the IMS network system, a calling terminal 10, an RAN (radio access network) 14, an SGSN (serving GPRS (general packet radio service) support node) 15, a GGSN (gateway GPRS support node) 11, a P-CSCF (proxy call session control function) part 12, and a S-CSCF (serving call session control function) part 13 are connected via a communication network, thereby forming a calling-side communication network.

In the calling-side communication network, the GGSN 11 and the P-CSCF part 12 are connected via a PDN (packet data network) 16.

Additionally, in the IMS network system, a called terminal 20 (corresponding to a T-UE), a RAN (radio access network) 30, an SGSN 29, a GGSN 23, a P-CFCS part 27, a S-CSCF part 26, and an I-CSCF (interrogating call session control function) part 25 are connected via a communication network, thereby forming a called-side communication network.

In the called-side communication network, the GGSN 23 and the P-CSCF part 27 are connected via a PDN (packet data network) 40.

Instead of using server functions by devices such as RANs 14 and 30, SGSNs 15 and 29, and GGSNs 11 and 23 provided between the calling terminal 10 and P-CSCF part 12 and between the called terminal 20 and P-CSCF part 27, a communication network using a group of servers such as an E-UTRAN (evolved universal terrestrial radio access network), an MME (mobility management entity), a Serving-GW (gateway), and a PDN-GW (gateway) may be employed so as to form an IMS network system.

Figure 3:
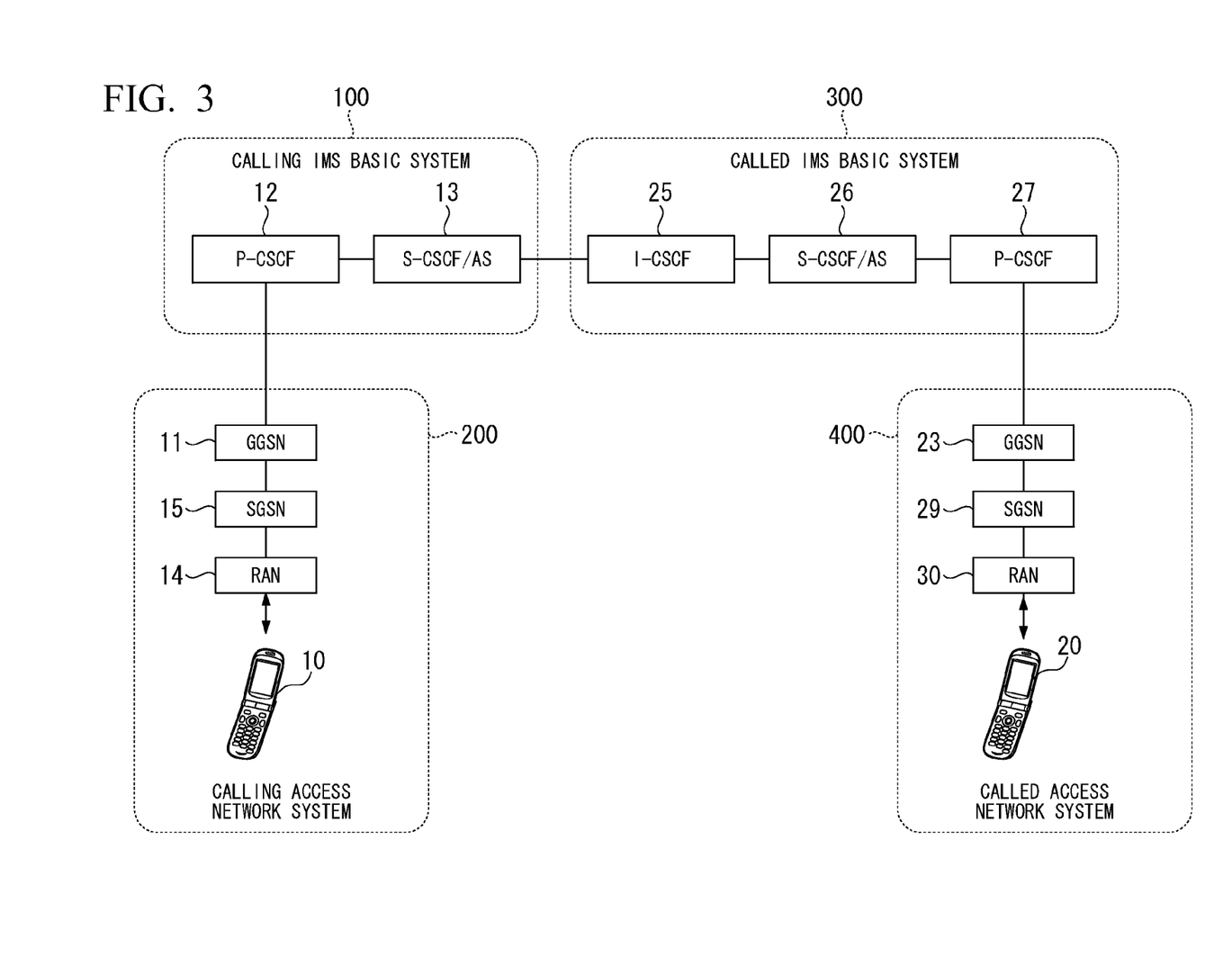
FIG. 3 is a third block diagram showing the structure of an IMS network system.

FIG. 3 is a third block diagram showing the structure of the IMS network system.

Referring to FIG. 3, an example of the structure of the IMS network system will be explained. FIG. 3 shows a structure obtained by further simplifying the IMS network system in FIG. 2 for convenience of explanations.

As shown in FIG. 3, the IMS network system is divided into a calling-side communication network and a called-side communication network. The calling-side communication network consists of a calling IMS basic system 100 and a calling access network system 200, and the called-side communication network consists of a called IMS basic system 300 and a called access network system 400.

The calling access network system 200 includes RAN 14, SGSN 15, and GGSN 11, and the calling IMS basic system 100 includes P-CSCF part 12, S-CSCF part 13, and an application server connected to S-CSCF part 13.

Similarly, the called access network system 400 includes RAN 30, SGSN 29, and GGSN 23, and the called IMS basic system 300 includes P-CSCF part 27, S-CSCF part 26, an application server connected to S-CSCF part 26, and I-CSCF part 25.

In the present embodiment, the called-side communication network is operated using a communication carrier which differs from that of the calling-side communication network, and thus, S-CSCF part 13 in the calling-side communication network is connected to I-CSCF part 25 in the called-side communication network. However, if the called-side communication network and the calling-side communication network are operated using the same communication carrier, S-CSCF parts of both communication networks are connected directly to each other.

Figure 4:
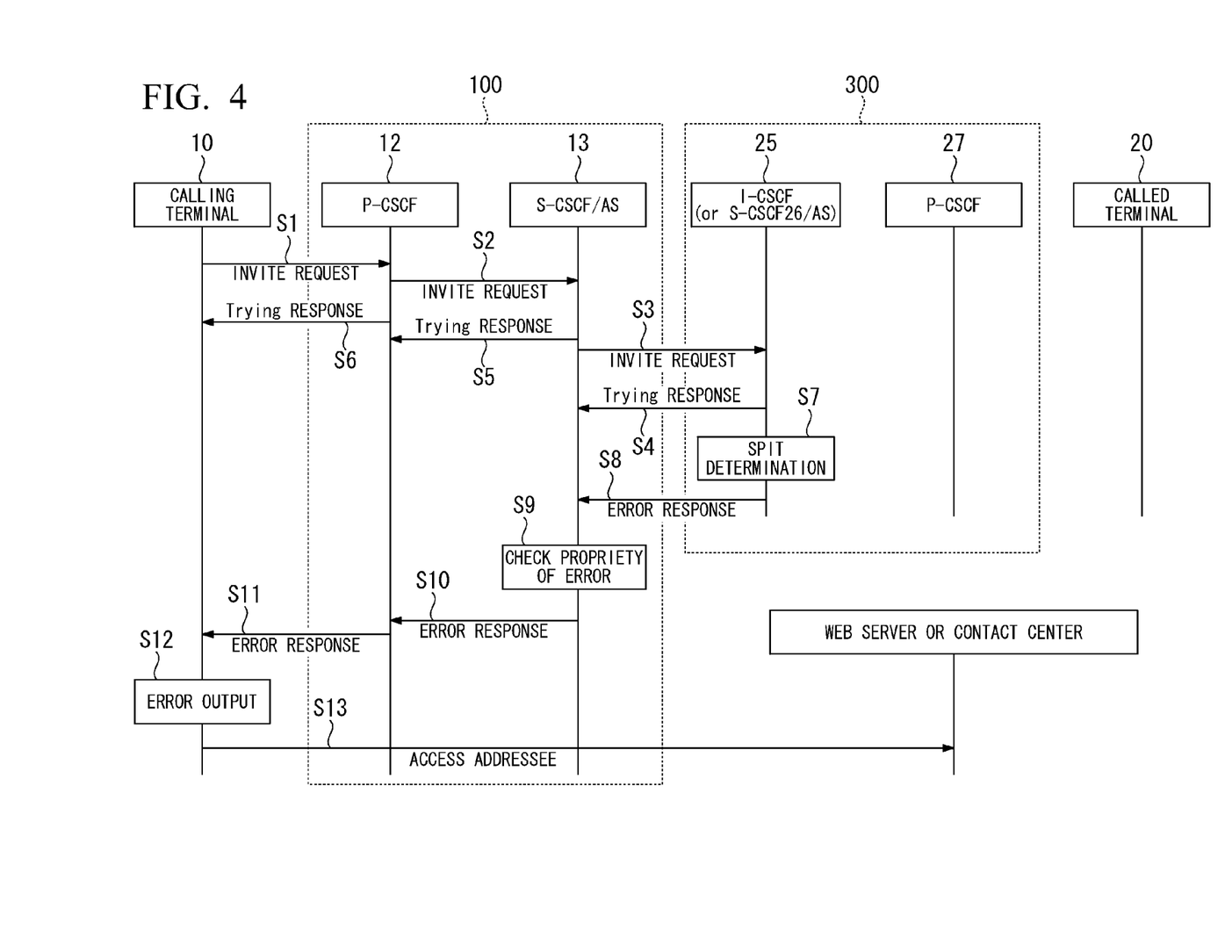
FIG. 4 is a diagram showing an operation flow of some devices in the IMS network system.

FIG. 4 is a diagram showing an operation flow of some devices in the IMS network system.

Referring to FIG. 4, the operation flow of the devices in the IMS network system will be explained.

First, when the calling terminal 10 sends an INVITE request (see step S1), the request is received by P-CSCF part 12 via the calling access network system 200.

The P-CSCF part 12 transfers the INVITE request to S-CSCF part 13 (see step S2), which detects the SIP-URI of the calling terminal 10. The S-CSCF part 13 also detects the SIP-URI of I-CSCF part 25 (in the called-side communication network) as an addressee which has been stored in the application server (AS) or the like in association with the relevant SIP-URI. The S-CSCF part 13 sends the INVITE request to the IP-URI of I-CSCF part 25 (see step S3).

When I-CSCF part 25 (as an access request receiving device, an access request cancel determination device, and an access request cancel notice sending device), S-CSCF part 13, and P-CSCF part 12 each receive the INVITE request, they each return a Trying response to the device which sent the relevant INVITE request (see steps S4, S5, and S6).

When I-CSCF part 25 returns the Trying response via step S4, it performs a SPIT (spam over IP telephony) determination (see step S7).

In the SPIT determination, the combination of SIP-URIs of the calling terminal 10 and the called terminal 20 stored in the INVITE request may be retrieved, and the determination is performed based on the above combination and information stored in an application server (AS), a memory, or the like.

More specifically, SPIT may be determined when the application server (AS) stores information (in association with the SIP-URI combination) which indicates whether the relevant access is approved or disapproved, and the information indicates that the access is disapproved (such disapproval information is stored by any method). In another example, SPIT may be determined when mechanically repeated sending (e.g., for every 5 minutes) of INVITE request for the detected SIP-URI combination is observed in a table of past INVITE requests.

If I-CSCF part 25 determines (in the SPIT determination) that the relevant INVITE request is a signal which indicates SPIT, I-CSCF part 25 registers information for identifying the calling terminal 10 (e.g., SIP-URI of the calling terminal 10) which sent the INVITE request in an application server or the like, as information which indicates that the relevant calling terminal is an improper calling terminal which performed SPIT operation and a target for cancelling future INVITE requests (as access requests).

In addition, I-CSCF part 25 sends an error response (as an access request cancel notice) to S-CSCF part 13 (see step S8).

The error response stores information of an addressee to be accessed so as to release the access request cancel registration. The addressee may be a mail address or a telephone number of a Web server or a contact center.

Additionally, information such as start time or duration for the restriction may also be included (in the error response) as error information.

If I-CSCF part 25 determines in the SPIT determination that the INVITE request is not a signal which indicates SPIT, I-CSCF part 25 performs a conventional normal operation that sends the INVITE request to the called terminal 20 via P-CSCF part 27 in the called-side communication network.

Although I-CSCF part 25 performs the SPIT determination in the present embodiment, an S-CSCF part or an application server connected to the S-CSCF part may instead perform the SPIT determination.

When S-CSCF part 13 receives the error response sent from I-CSCF part 25, it checks propriety of the error response (see step S9).

In the above propriety checking, S-CSCF part 13 may determine (i) whether the application server (AS) connected to itself has stored (a) information for node identification, such as an IP address or host name of I-CSCF part 25 indicated (in the error response) as the sender of the error response, or (b) SIP-URI for an error session, or (ii) whether the structure or content of the corresponding SIP header has consistency.

When the propriety of the error response can be confirmed, S-CSCF part 13 (as an addressee information communicating device) transfers the error response to P-CSCF part 12 (see step S10), and the P-CSCF part 12 further transfers the error response to the calling terminal 10 (see step S11).

When receiving the error response, the calling terminal 10 displays the information (about an addressee to be accessed (i.e., addressee information), details of the error, etc.) stored in the error response, on a display part or the like (see step S12).

The calling terminal 10 also sends an access request signal to the addressee indicated by the addressee information in response to a user's operation, or automatically (see step S13).

When S-CSCF part 13 sends the error response in step S10, the addressee information included in the error response sent from I-CSCF part 25 may be replaced with different addressee information, and the different addressee information may be sent. For example, the information of an addressee to be accessed on the called side may be replaced with an addressee to be dedicatedly accessed on the calling side. Accordingly, the calling terminal 10 can be connected to such a dedicate addressee on the calling side.

In accordance with the above-described procedure, since a message which clearly indicates a disconnection by means of the operation of PUCI, and an addressee (telephone number or URL for the release request) to be accessed so as to release the registration as a bad caller are both communicated to the caller, it is possible to assist acquisition of information for recognizing a fact that the caller itself has been registered as a bad caller and for releasing such registration.

Although the present embodiment employs an INVITE method typically used for voice communication in IMS, the present invention can be applied to any method used in IMS, for example, a REGISTER method of registering the existence of UE to a CSCF part (as SIP server) or a MESSAGE method for sending and receiving text messages.

The device as each entity in the IMS network system includes a computer system.

Each of the above-described processes is stored as a program format in a computer-readable storage medium, and executed when the relevant computer loads and executes the program.

The computer-readable storage medium may be a magnetic disk, a magneto-optical disk, a CD-ROM, a DVD-ROM, or a semiconductor memory. Such a computer program may be provided to a computer via a communication line, and the computer which receives the program may execute the program.

In addition, a program for performing a portion of the above-explained processes may be used. Furthermore, a differential file (i.e., a differential program) to be combined with a program which has already been stored in the computer system may be provided to realize the above processes.

Industrial Applicability

In accordance with the present invention, since a message which clearly indicates a disconnection by means of the operation of PUCI, and an addressee (telephone number or URL for the release request) to be accessed so as to release the registration as a bad caller are both communicated to the caller, it is possible to assist acquisition of information for recognizing a fact that the caller itself has been registered as a bad caller and for releasing such registration.

Additionally, the present operator (communication carrier) can know information of a subscriber who belongs to the present operator and has been registered as a bad caller by another operator. Therefore, a further restriction may be imposed on a subscriber who has troubled another operator. Accordingly, it is possible to prevent a case in which not only is a spam call issued, but also the relevant network is affected by means of virus infection or the like.

Reference Symbols

1 O-UE (originating UE)
2 T-UE (terminating UE)
10 calling terminal
11 GGSN (gateway GPRS (general packet radio service) support node)
12 P-CSCF (proxy call session control function) part
13 S-CSCF (serving call session control function) part
14 RAN (radio access network)
15 SGSN (serving GPRS (general packet radio service) support node)
16, 40 PDN (packet data network)
20 called terminal
21 TrGW (translation gateway)
22 Stage 2 server
23 GGSN (gateway GPRS support node)
24 PUCI-AS (protection against unsolicited communication for IMS-application server)
25 IBCF (interconnect border control function) part, I-CSCF (interrogating call session control function) part
26 S-CSCF (serving call session control function) part
27 P-CSCF (proxy call session control function) part
28 PUCI-AS (protection against unsolicited communication for IMS-application server)
29 SGSN (serving GPRS support node)
30 RAN (radio access network)

The invention claimed is:

1. A communication method comprising:
identifying, by an Internet Multimedia Subsystem (IMS) that provides a multimedia service, a communication from an originating device to a terminating device as unsolicited communication (UC); and
transmitting, by the IMS, a signal, which includes information related to the UC, indicating that the communication has been identified as UC to the originating device.

2. The communication method according to claim 1, wherein
said IMS informs another IMS of information on the communication identified as UC.

3. A communication system comprising:
   an originating device;
   a terminating device; and
   an Internet Multimedia Subsystem (IMS) that provides a multimedia service and transfers a communication from the originating device to the terminating device, wherein the IMS identifies a communication from the originating device to the terminating device as unsolicited communication (UC) and transmits a signal, which includes information related to the UC, indicating that the communication has been identified as UC to the originating device.

4. The communication system according to claim 3, wherein
   said IMS informs another IMS of information on the communication identified as UC.

\* \* \* \* \*